United States Patent [19]
Moriya

[11] Patent Number: 5,414,522
[45] Date of Patent: May 9, 1995

[54] IMAGE READING APPARATUS WHICH DETECTS DOCUMENT SIZE

[75] Inventor: Shigeru Moriya, Toyokawa, Japan

[73] Assignee: Minolta Camera Kabushiki Kaisha, Osaka, Japan

[21] Appl. No.: 932,248

[22] Filed: Aug. 19, 1992

[30] Foreign Application Priority Data

Aug. 20, 1991 [JP] Japan ................................ 3-208087
Aug. 20, 1991 [JP] Japan ................................ 3-208092

[51] Int. Cl.$^6$ ............................................. H04N 1/21
[52] U.S. Cl. ................................. 358/296; 358/449; 358/488; 358/497; 355/311
[58] Field of Search ............... 358/449, 488, 497, 296; 355/311

[56] References Cited

U.S. PATENT DOCUMENTS

| | | | |
|---|---|---|---|
| 4,554,592 | 11/1985 | Yoshida | 358/449 |
| 4,686,577 | 8/1987 | Arimoto | 358/449 |
| 4,698,511 | 10/1987 | Sueda et al. | 250/560 |
| 4,922,350 | 5/1990 | Rombola et al. | 358/488 |
| 5,041,919 | 8/1991 | Yamamoto et al. | 358/449 |
| 5,198,853 | 3/1993 | Ichihara et al. | 355/311 X |
| 5,228,099 | 7/1993 | Yamada | 358/449 X |

FOREIGN PATENT DOCUMENTS

60-4974 2/1985 Japan .
62-170948 7/1987 Japan .

*Primary Examiner*—Benjamin R. Fuller
*Assistant Examiner*—Randy W. Gibson
*Attorney, Agent, or Firm*—Burns, Doane, Swecker & Mathis

[57] ABSTRACT

Image data of a plurality of lines in a document are read in the main scan direction and/or in the subscan direction, and the document size is determined on the basis of the image data of the plurality of lines. Thus, the erroneous detection of document size can be avoided. The document size is determined for example as an average of the document sizes detected for lines except the smallest and largest document sizes. When the same anomaly is observed twice, new lines are used to determine the document size. Further, an image reading apparatus reads image data of a line in a document in the main scan direction and in the subscan direction with a linear image sensor. When the document size is detected on the basis of the image data of a plurality of lines in the main scan direction, the document is scanned in the subscan direction at a fast read rate, while the document size is detected on the basis of the image data of a plurality of lines in the subscan direction, the document is scanned in the subscan direction at a low read rate.

20 Claims, 12 Drawing Sheets

IMAGE READING APPARATUS WHICH DETECTS DOCUMENT SIZE

BACKGROUND OF THE INVENTION

1. Field of the Invention

The present invention relates to the size detection of a document in an image reading apparatus, a digital copying machine or the like.

2. Description of the Related Art

The document size is an important quantity which relates almost all processing of the copying operation in a digital copying machine or the like, and it has to be detected correctly in order to improve the performance of a copying machine. The copying operation is performed on the basis of the detected document size.

In a digital copying machine, a document size is detected with use of sensors positioned at predetermined locations.

However, the document size detection may be erroneous when dusts or damages exist on a platen glass or on a platen cushion at the above-mentioned sensor positions.

The document size is also detected by reading image data by sampling image data signals of predetermined lines in the main scan and subscan directions. The copying operation is performed on the basis of the detected document size.

However, the document size detection may be erroneous when dusts or damages exist on a platen glass or on a platen cushion at the above-mentioned predetermined lines.

Further, when the sampling is performed with a linear image sensor for the size detection in the main scan and subscan directions, a line buffer of the capacity of a plurality of lines is needed if the real-time processing of the size detection is not performed. Then, previously, the scanner is set to be moved at a constant speed in the subscan direction for the real-time processing by using a line buffer of the capacity of a single line.

SUMMARY OF THE INVENTION

An object of the present invention is to provide an image reading apparatus which can detect a document size correctly.

It is another object of the present invention to provide an image reading apparatus which can detect a document size efficiently with use of a line buffer of the capacity of a single line.

In one aspect of the present invention of an image reading apparatus, image data of a plurality of lines in a document are read in the main scan direction and/or in the subscan direction, and the document size is determined on the basis of the image data of the plurality of lines. The document size is determined for example as an average of the document sizes detected for lines except the smallest and largest document sizes. When the same anomaly is observed twice, new lines are used to determine the document size.

In another aspect of the present invention, an image reading apparatus has an image read means for reading image data of a line in a document in the main scan direction and in the subscan direction with a linear image sensor. When the document size is detected on the basis of the image data of the lines in the main scan direction, the document is scanned in the main scan direction at a fast read rate, while the document size is detected on the basis of the image data of the line in the subscan direction, the document is scanned at a low read rate.

An advantage of the present invention is that erroneous detection of document size can be avoided.

Another advantage of the present invention is that the detection of document size can be performed efficiently in a short time.

BRIEF DESCRIPTION OF THE DRAWINGS

These and other objects and features of the present invention will become clear from the following description taken in conjunction with the preferred embodiments thereof with reference to the accompanying drawings, and in which.

Figure 1:
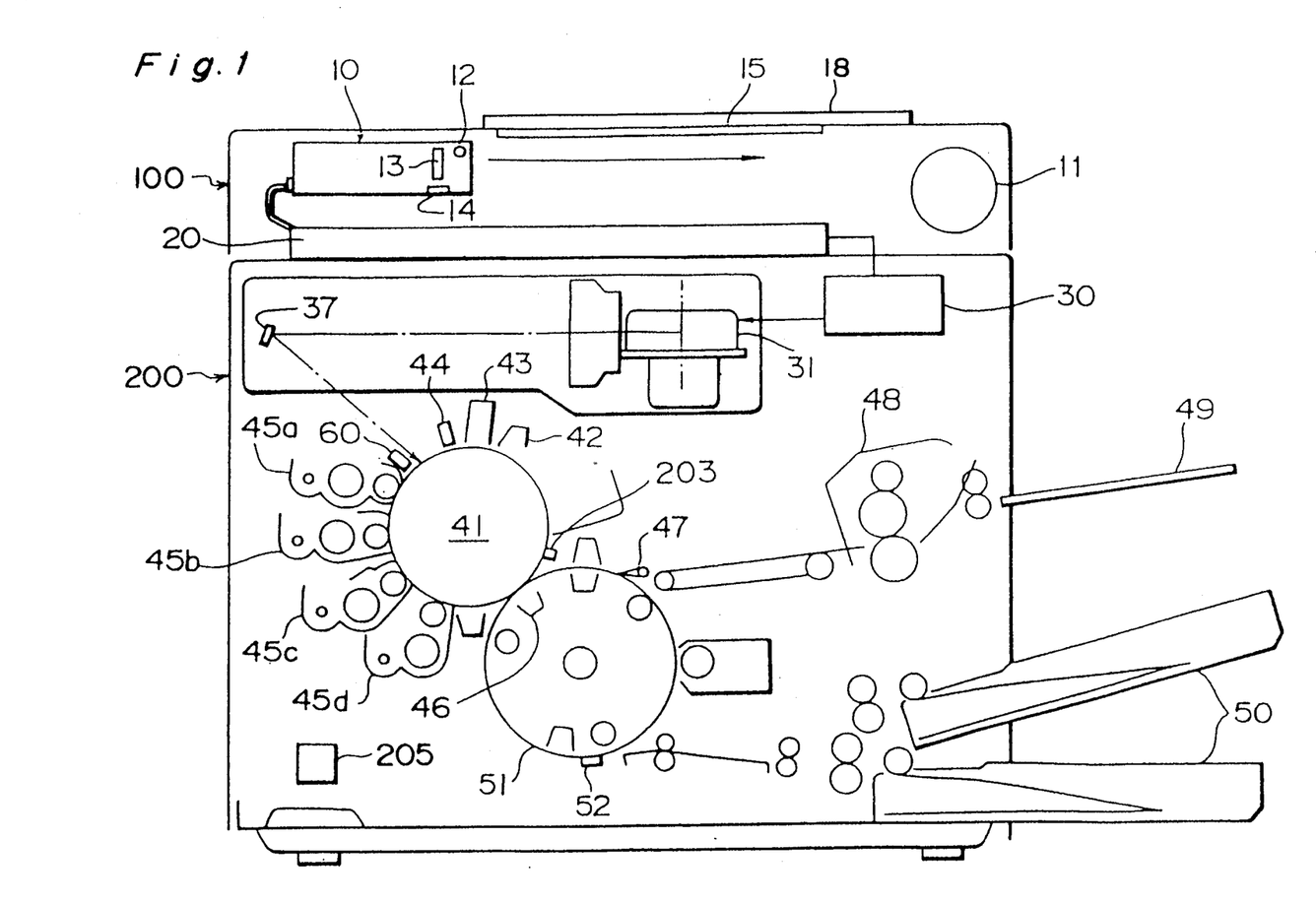
FIG. 1 is a schematic sectional view of the structure of a digital color copying machine.

DETAILED DESCRIPTION OF THE PREFERRED EMBODIMENTS (A) Structure of Digital Copying Machine Referring now to the drawings, wherein like reference characters designate like or corresponding parts throughout the views, FIG. 1 shows a schematic structure of a digital color copying machine which consists mainly of an image reader 100 for reading a document image and a printer 200 for reproducing the document image.

In the image reader 100, a scanner 10 mounts an exposure lamp 12, a rod lens array 13 to collect reflection light from a document put on a platen 15 and a contact type CCD color image sensor 14 to convert the collected light into an electric signal. A cover 18 is provided on the platen 15 in order to cover a document put on the platen 15 when an image of the document is read. The scanner 10 is driven by a motor 11 to move in the direction (subscan direction) denoted by an arrow in FIG. 1. The optical image of the document illuminated by the exposure lamp 12 is converted by the image sensor 14 into a multi-level electric signal of red (R), green (G) and blue (B). The electric signal is converted by an image signal processor 20 to 8-bit gradation data of yellow (Y), magenta (M), cyan (C) or black (K), and they are stored in a line buffer memory 30 for synchronization.

Figure 6:
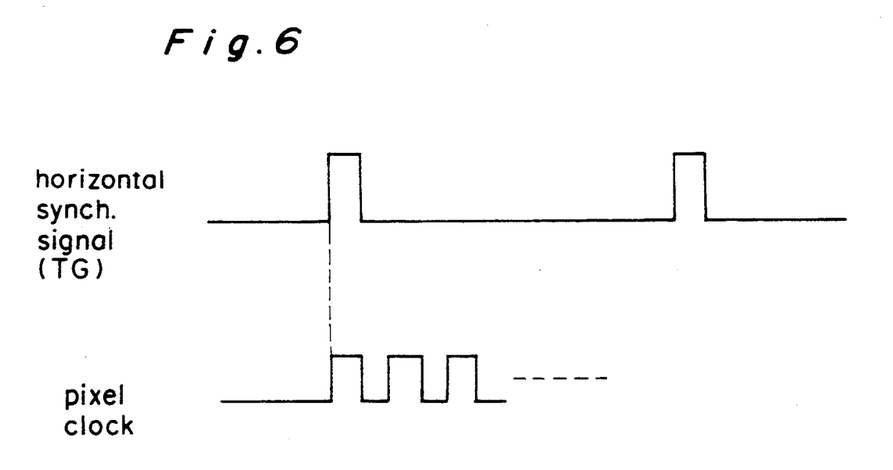
FIG. 6 is a timing chart of clock signals.

Then, in the printer 200, a print head 31 performs the gradation correction (gamma correction) of the gradation data and it converts the corrected image data to a drive signal to drive a laser diode 264 (not shown) in the print head 31 (refer FIG. 6).

A laser beam emitted from the print head 31 according to the gradation data-exposes a photoconductor drum 41 driven to be rotated, via a reflection mirror 37. The photoconductor drum 41 has been illuminated by an eraser lamp 42 and has been sensitized uniformly by a sensitizing charger 43 for each copy before the exposure. When the exposure is performed onto the photoconductor in the uniformly charged state, an electrostatic latent image is formed on the photoconductor drum 41. Then, one of developers 45a–45d of yellow, magenta, cyan and black toners is selected to develop the latent image. The developed image is transferred by a transfer charger 46 to a paper wound on a transfer drum 51. In this process, the paper is supplied from a paper cassette 50 and is chucked at the top of the paper by a chucking mechanism 52 on the transfer drum 51 in order to prevent a shift of position on the image transfer.

The above-mentioned printing process is repeated four times for yellow, magenta, cyan and black. At each time, the scanner 10 repeats the scan in synchronization with the motions of the photoconductor drum 41 and the transfer drum 51. Then, the paper is isolated from the transfer drum 51 with the operation of an isolation claw 47 to be sent to a fixer 48 for fixing, and the paper is carried out to a paper tray 49.

(B) Image Data Signal Processing

Figure 2:
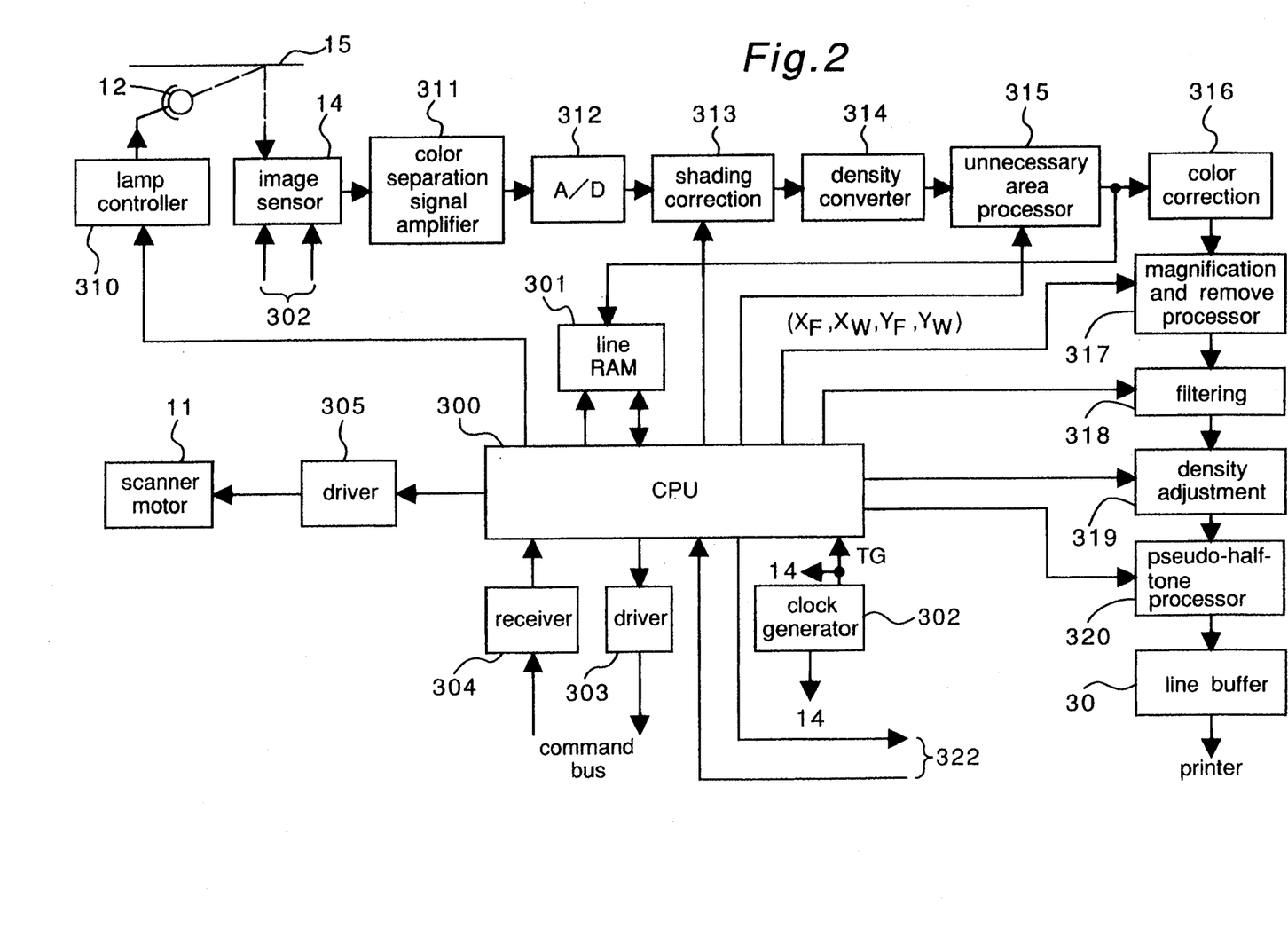
FIG. 2 is a block diagram of image reading processor.

FIG. 2 shows a block diagram of the control system of image processing of the digital color copying machine of FIG. 1. A CPU 300 controls the image processing. The CPU 300 sends and receives a command via a driver 303 and via a receiver 304 with a print controller (not shown) which controls the printer 200.

The CPU 300 sends control signals to the lamp controller 310 to control the exposure lamp 12. The CPU 300 receives a signal from a scanner position sensor 322 and controls a driver 305 to drive the scan motor 11.

The CCD image sensor 14 is driven according to the timing signals and CCD driving clock signals received from a clock generator 302. The timing generator 302 also sends the timing signals to the CPU 300. In the image data processor 20, the output signal received from the CCD color image sensor 14 is processed as explained below. That is, in a color separator and signal amplifier 311, the image signal of a document which has been converted to an electrical signal by the CCD color image sensor 14 is separated into image signals of three colors of red, green and yellow and amplified. Then, the image signals of the three colors are processed in parallel to a color correction section 316. First, the signal is converted to a multi-level digital signal in an analog-to-digital converter 312. The converted image data is corrected for the shading in the shading correction section 313 with reference to the standard data obtained by reading a white standard plate. The data corrected is the data of reflection light from a document, and it is converted logarithmically to the density data of an actual image in the density converter 314. Then, the density data is sent to the color correction section 316 when the document image is copied.

The document size is detected before the reading and copy of the document, as will be explained later in detail.

After the document size is detected, the CPU 300 sends scanner control signals via the driver 305 to the scanner motor 11 for reading operation. The scanner moves at a constant speed, and the image sensor 14 reads image data. The image data processed as mentioned above in the sections 311–315 as mentioned above are processed further as explained below. In the color correction section 316, the density data R, G, B of three colors are converted to data of cyan, magenta and yellow and black, and adjusted to the reproduction characteristics of the printer 200. Then, a magnification and remove section 317 magnifies and removes the data electrically according to the data indicated with the operational panel. Then, the smoothing and edge emphasis processings are performed according to the instruction by the CPU 300 by a filtering processor 318. Then, the density adjustment circuit 319 adjust the density data by performing linear transformation. Then, the data of a half-tone image are processed for pseudo-half-tone processing if necessary in a pseudo-half-tone processor 320, and the resultant data are sent via a line buffer 30 to the controller of the printer 201.

(C) Document Size Detection

When a user presses a start key (not shown) in an operational panel, the image sensor 14 mounted on the scanner 10 reads image data of a document put on the platen 15 to decide the document size. Then, the image of the document is read and a copying operation is performed on the basis of the document size.

Figure 3:
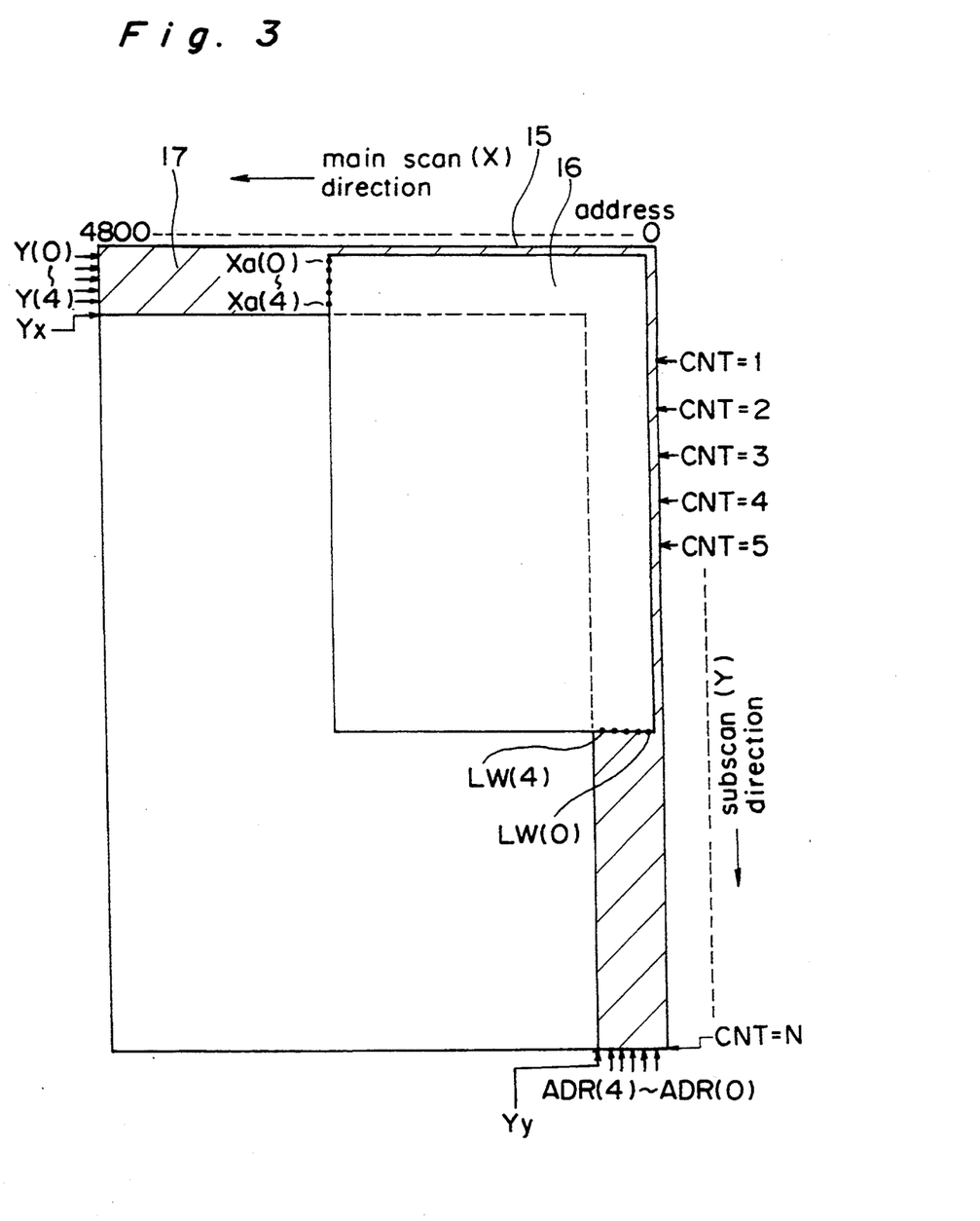
FIG. 3 is a diagram of the scan lines for the document size detection in the main scan and subscan directions.

As shown in FIG. 3, in the present embodiment, image data of a plurality of lines both in the main scan and subscan directions in a document 16 put on the platen 15 are read. In the main scan direction, five lines Y(0), Y(1), ..., Y(4) set at every predetermined line distance (say at every two lines) are scanned successively. The image data of one of the five lines are read at all addresses 0–4800 and stored in the line RAM 301. Then, the edge Xa(i) of the document along the line "i" is determined from the image data. This is repeated for the five lines. Then, the five edges Xa(i) (i=1, 2, ..., 5) of the document 16 are processed to determine the document size, as explained later. In the subscan direction, five lines at five addresses ADR(0)–ADR(4) in the subscan direction are set at every predetermined line distance (say at every five lines) in a limited range near the address "0". Then, image data are sampled in the limited range from the address "0" to an end address Yy (say address "240"), and they are stored in the line RAM 301. Then, the edge LW(0)–LW(4) of the document for the five lines in the subscan direction are decided. This is repeated for each horizontal line of line number CNT until the end of the platen 15. Then, the five edges LW(0)–LW(4) are processed to decide the document size in the subscan direction.

Figure 4:
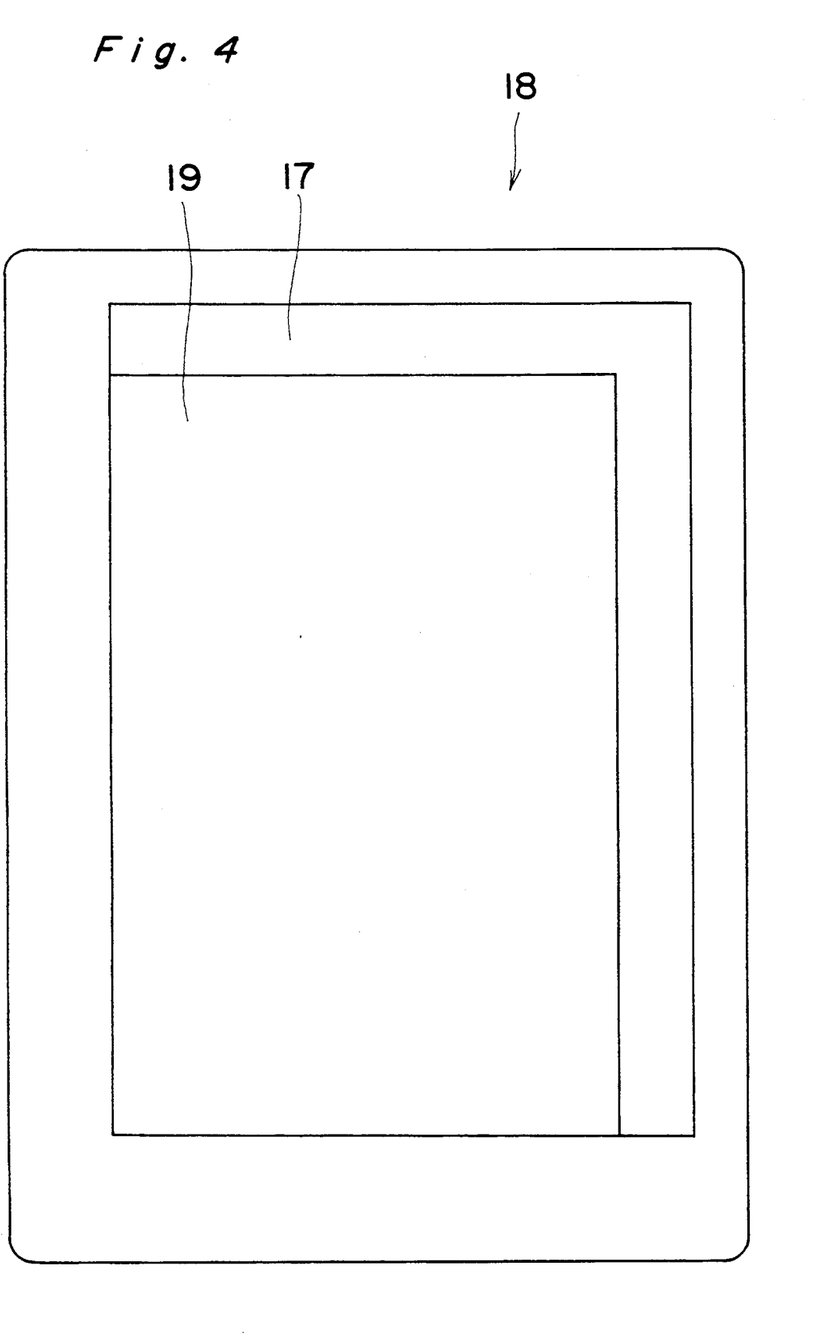
FIG. 4 is a bottom view of a cover of the platen.

In order to make sure the detection of document edge as a last transition point from white to black, as shown in FIG. 4, the cover 18 provided on the platen 15 has an L-character-like area 17 of black color. In FIG. 3, this area 17 is partly shaded by the document 16 put directly on the platen 15. The end points Yx and Yy for the document size detection in the main and subscan directions are determined in correspondence to the boundary of the L-character-like area 17. An area 19 except the L-character-like area 17 to be put on the platen 15 may have any color.

The document size is determined according to the data Xa(1)–Xa(5) in the main scan direction and according to the data LW(0)–LW(4) in the subscan direction. Then, it is examined if the document size is valid. If an anomaly is detected from the data Xa(1)–Xa(5) and LW(0)–LW(4), the document size detection is performed again. If the same anomaly is detected again, the document size detection is performed again but on different lines. This process is repeated until the valid document size is detected.

The detection of document size with use of image data can be performed at a low cost if the line RAM 301 of a capacity of one line is used to store image data of a line in order to determine the document size by deciding successively if the signal of a pixel is black or not. If the sampling of image data is performed in the main scan and subscan directions, a buffer of a plurality of lines is needed when real-time processing is not performed. In the present embodiment, the line RAM 301 is used, and the scanner 10 which mounts the linear image sensor 14 is moved at a constant speed for real-time processing.

When the scanner 10 is moved at a constant speed, the CPU has to process all data in a horizontal line to determine the document edge in the main scan direction, while in the subscan direction, the data only in a limited range in a horizontal line including the predetermined vertical lines is needed to detect the edge of the document. Then, if the scanner is moved in accordance to the processing time in the main scan direction, the document size detection time becomes longer. On the other hand, if the scanner is moved in accordance to the processing time in the subscan direction, the sampling range in the main scan direction has to be limited, and this decreases the precision of the size detection. Then, in this embodiment, the scan speed of the scanner 10 is set to be low for the document size detection in the main scan direction while high for the document size detection in the subscan direction, as will be explained.

In other words, in the detection of the document edge in the main scan direction, all data of addresses of "0" to "4480" are read, while in the subscan direction, data in the limited range to the address "240" are read. Thus, the amount of data of a line to be handled is 4,800 in the main scan direction, while 240 in the subscan direction. Thus, a much larger amount has to be detected in the main scan direction. Then, in order to maintain the detection precision, the scanner 10 is moved at a low speed in the detection of the edge in the main scan direction, while it is moved at a high speed in the detection in the subscan direction.

When an operator presses the start key, the print controller sends a start command of copy operation through the receiver 304 to the CPU 300. Then, the CPU 300 prepares the units of the copying machine for copying via the driver 303. Then, the CPU 300 sends a signal to the lamp controller 310 to turn on the exposure lamp 12. At the same time, the CPU 300 communicates with the scanner position sensor 322, and when the scanner 10 is confirmed to be located in the home position, the CPU 300 sends a scanner control signal to the driver 305 to drive the scanner 10.

Figure 5:
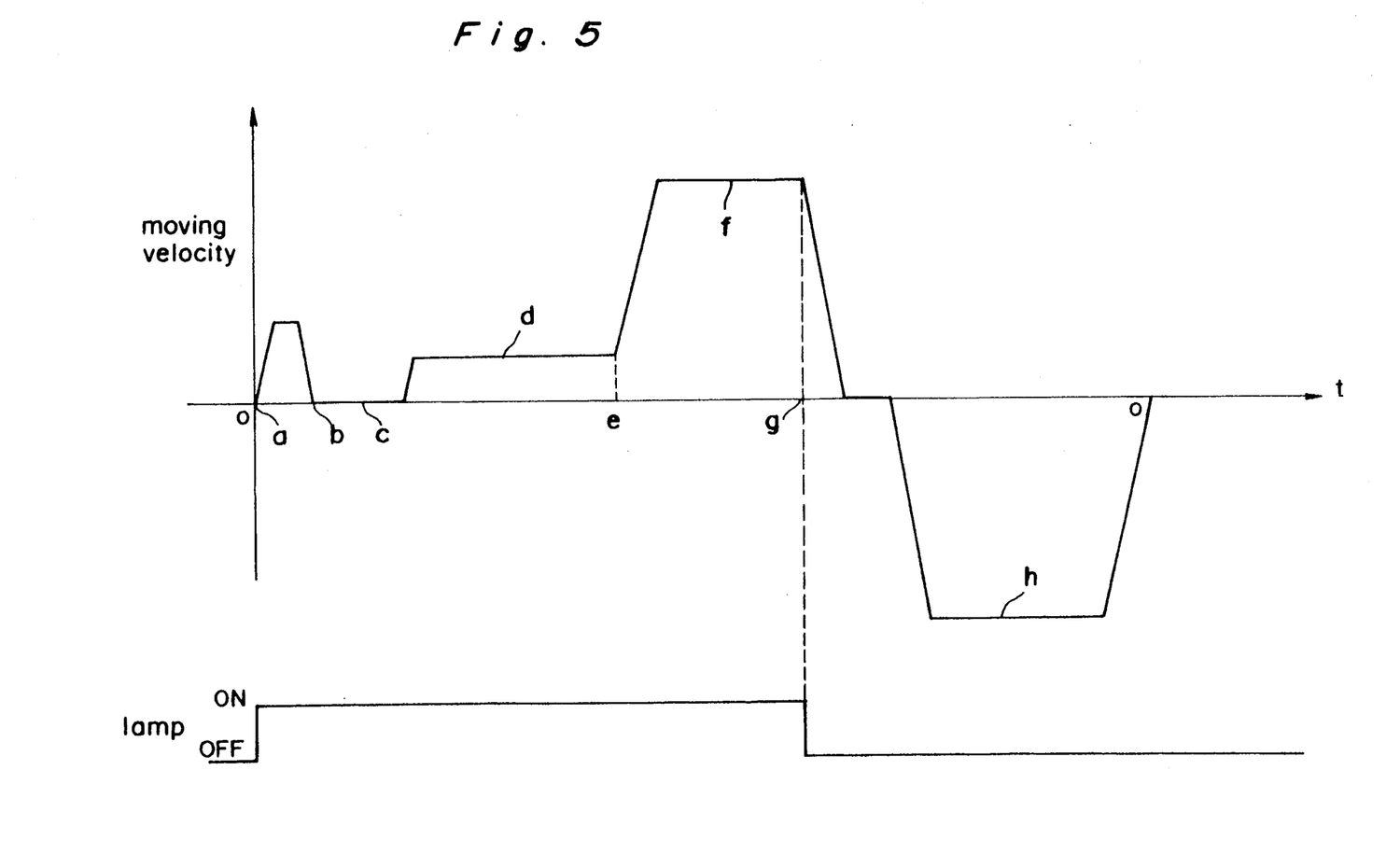
FIG. 5 is a diagram of the moving velocity plotted against time.

In concrete, the scanner 10 is controlled according to the diagram of time vs. moving velocity relation shown in FIG. 5. First, the scanner 10 is moved from the home position (time a) at a constant acceleration to reach a prescribed speed, moves further and decelerates to reach to the document 10 top position (time b). Then, the scanner 10 waits till the lamp 12 becomes stable (period c). Then, the scanner 10 moves at a low speed to detect image data in the main scan direction (period d). In this period, five lines in the main scan direction are read. Further, the scanner 10 is moved further at a high speed to read image data in the subscan direction (period f). The lamp 12 is turned off as soon as the detection of the document size in the subscan direction completes (time g). Then, the scanner 10 returns to the home position at a high constant speed (period h).

When the scanner 10 moves to read image data, the image sensor 14 mounted in the scanner 10 reads the reflection light from a document put on the platen 15 illuminated by the lamp 12. The image sensor 14 is a linear array of color CCD sensor elements which decompose an optical signal into three colors of red, green and blue and converts the optical signal to an electrical signal. In this embodiment, the image sensor 14 can read a line of about 300 mm at a resolution of 1/16 mm/dot. The image sensor 14 is driven with horizontal synchronization signals TG generated for the scan of each line and CCD drive clocks both generated by the clock generator 302 in order to read image data in accordance to the pixel clocks (refer FIG. 6). The horizontal synchronization signal TG is also supplied to the interrupt terminal of the CPU 300, and the CPU 300 can monitor the trailing edge of TG signals. On the other hand, the image sensor senses the leading edge of the TG signals. The clock generator 302 generate horizontal synchronization signals TG when the linear image sensor 14 reads image data in the main scan direction.

In the detection of the document size, the CPU 300 always monitors the position of the scanner 10 on the basis of a position signal received from a position detection switch 322 (not shown). When the scanner position is decided not be at a predetermined size detection position, the CPU 300 sends a signal to the unnecessary region processor 315 to make the image data signals invalid, and the unnecessary data processor 315 replaces the density data with white data in the position decided to be unnecessary for document detection. On the other hand, when the CPU 300 detects that the scanner position is a line for document size detection, it sends control signals to the image sensor 14 and to the line RAM 301 to write the image data of the position in the line RAM 301. The control signal comprises a write request signal, a write stop signal both for the image sensor 14 and a read start request signal for the line RAM 301. Thus, the line RAM 301 stores the image data of a line for document size detection. The scanner 10 moves according the TG signals generated by the clock generator 302 and repeats the above-mentioned processing until it reaches the final position for document size detection. Then, the CPU 300 processes the data stored in the line RAM 301 to detect the document size.

The CPU 300 determines the range of image reading according to the detected document sizes in the main scan and subscan directions. For example, a paper size such as A4 which includes the document sizes may be adopted.

(D) Detection of Anomalous Line

The document size may be erroneous when dusts or damages exist on a platen glass at the above-mentioned lines for document size detection. In this embodiment, the anomaly is detected according to the scattering of the detected edge values. In order to check the scattering, the scattering of three detected edge values except the smallest and largest ones is decided to exceed a predetermined value $\epsilon_0$ or not. Usually, the scattering is not large, and the average of the three edges except the largest and smallest ones is calculated and it is determined as the document size. On the contrary, if the scattering is decided to be large, the edge values are not used to determine the document size. Further, the anomaly is checked again in order to avoid spurious errors. If the same anomaly is detected again, the lines for document size detection are changed.

Even if the scattering is found not so large, the smallest and largest edge values of the five are checked if they are different largely from the average of the central three values more than a predetermined value $\epsilon_1$. If the difference is large, the edge detection is anomalous. Then, the document size is taken as valid tentatively and the copying operation is performed by using the document size, while the position of the anomalous line and the edge value are stored in a memory. If the same anomaly is detected in a following document size detection, the lines for document size detection are changed.

(E) Processing of Image Data for Document Size Detection

The image data read by the image sensor 14 are processed by the CPU 300 for deciding the document size, as explained below.

(e-1) Document Size Detection

Figure 8:
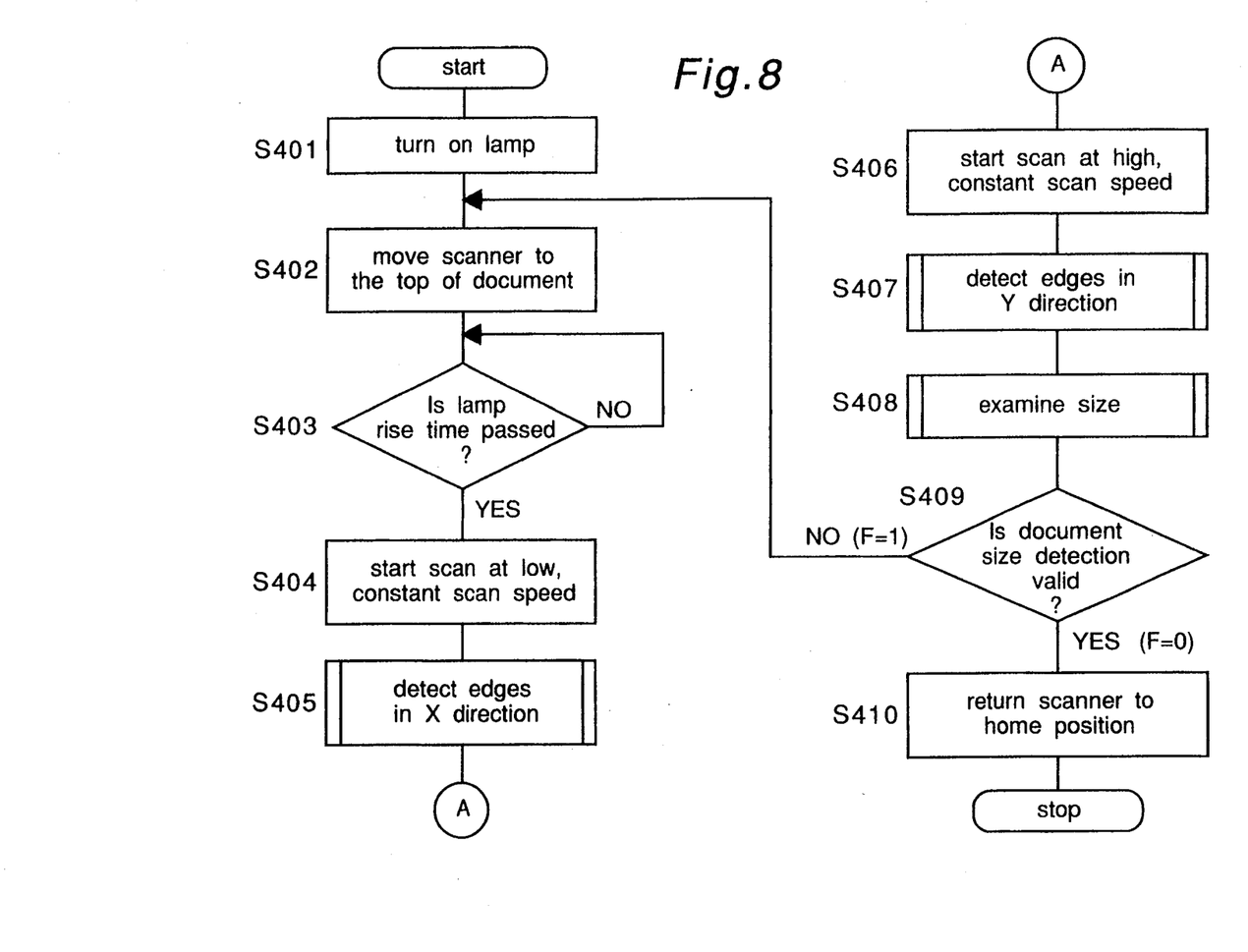
FIG. 8 is a flowchart of the main routine of the document size detection of the CPU 300.

FIG. 8 shows the main routine of the document size detection of the CPU 300. When the start key is detected by the CPU 300 to be pressed, this flow starts. First, the lamp 12 is turned on (step S401), and the scanner 10 is moved to the top of the document (step S402). After a predetermined time is decided to pass for the warmup of the lamp 12 (YES at step S403), the scanner 10 is started to move in the subscan direction at a low constant scan speed (step S404), and image data of document are read for five lines to detect the edges for the five lines in the main scan (X) direction (step S405). Then, the scanner 10 is started to move at a high constant scan speed (step S406), and image data of document are read to detect the edges for the five lines in the subscan (Y) direction (step S407, refer FIG. 9). Next, the document size determined from the edge data obtained at steps S405 and S407 are examined and if they are decided to be valid, the document size is determined (step S408, refer FIG. 10). Then, it is decided if the document size is valid or not or the invalid flag F is "1" or not (step S409). If the document size is decided to be valid, the scanner 10 is returned to the home position (step S410), and this flow completes. Then, the copy operation is performed by using the document size as a parameter. If it is decided that the document size is not valid (NO at step S409), new lines for document size detection has been determined at step S408 and the flow returns to step S402 for document size detection.

(e-2) Edge Detection in the Main Scan Direction

Figure 7:
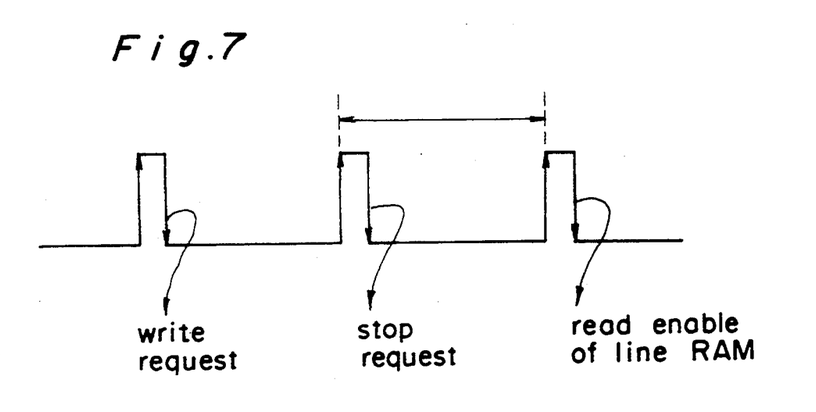
FIG. 7 is a timing chart of control signals.
Figure 9:
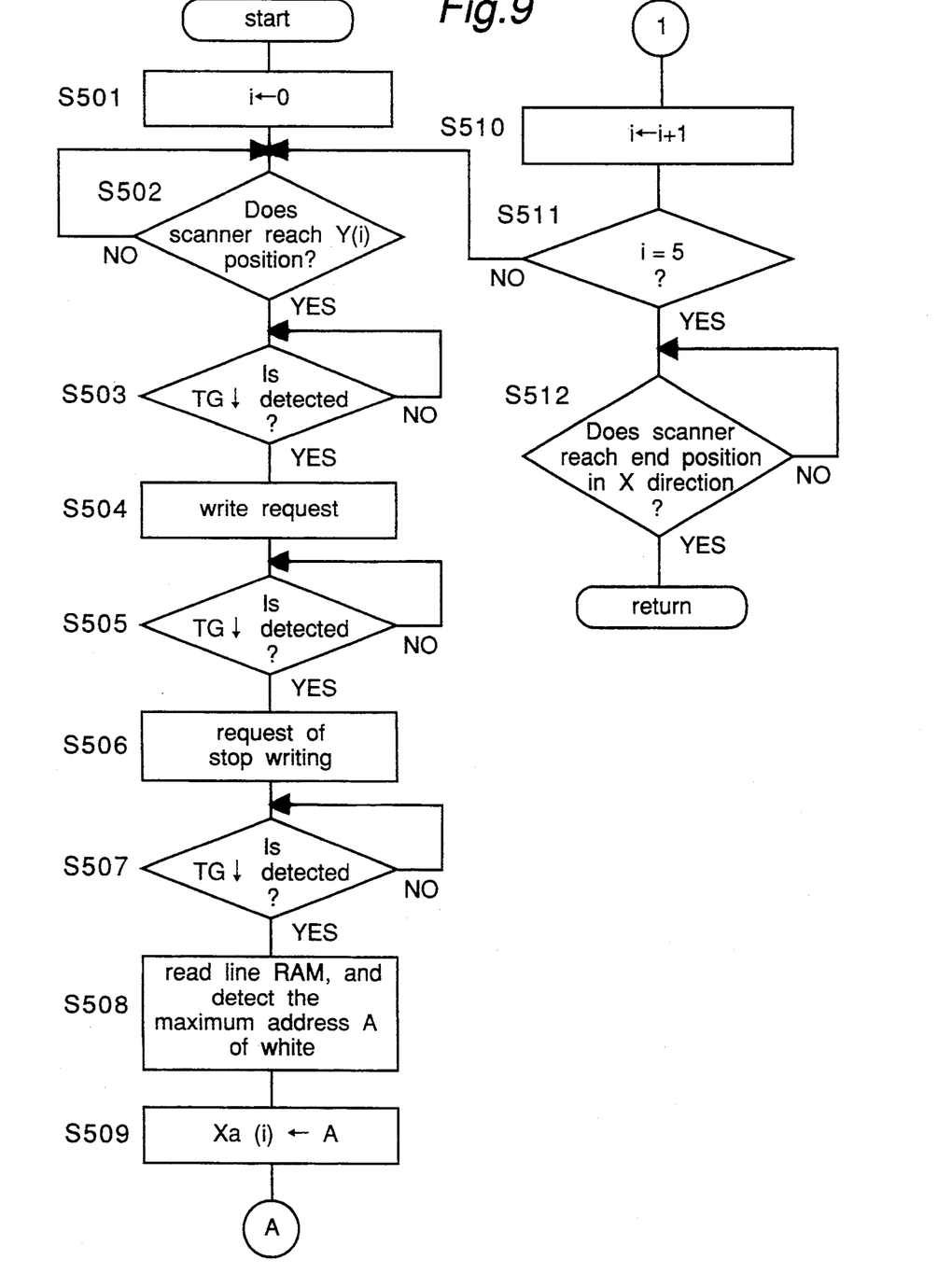
FIG. 9 is a flowchart of the size detection in the main scan direction.

FIG. 9 shows a flow of the edge detection in the main scan (X) direction (FIG. 8, step S405). First, a line parameter "i" is initialized to be zero (step S501). Then, if it is decided that the scanner 10 reaches a predetermined detection line position Y(i) (i=1 in this case) on the basis of the signal of the sensor 322 (YES at step S502) and if a TG signal (the first signal in FIG. 7) generated by the clock generator 302 is decided to be received from the clock generator 302 (YES at step S503), a write request is sent to the image sensor 14 to integrate the reflection light (step S504). Next, when another TG signal (the second signal in FIG. 7) is decided to be detected (YES at step S505), a write stop request is sent to the image sensor 14 (step S506), and the image data signals of a line (4800 CCD elements) are sent successively to the line RAM 301 in a period denoted with a double arrow in FIG. 7. Next, when a still further TG signal (the third signal in FIG. 7) is decided to be detected (YES at step S507), the image data stored in the line RAM 301 are read and the address "A" which denotes the last address of white data is detected from the image data (step S508), and the address "A" is written in Xa(i) which denotes the edge in the main scan direction (step S509). Then, the line parameter "i" is incremented by one (step S510), and the flow returns to step S502 for the size detection of a different line. If the parameter "i" is decided to be five (YES at step S511) or five lines have been detected already, when the scanner 10 is decided to be returned to the final position $Y_x$ of the size detection in the main scan direction (YES at step S512), this flow returns to the main flow for the edge detection in the subscan direction.

(e-3) Edge Detection in the Subscan Direction

Figure 10:
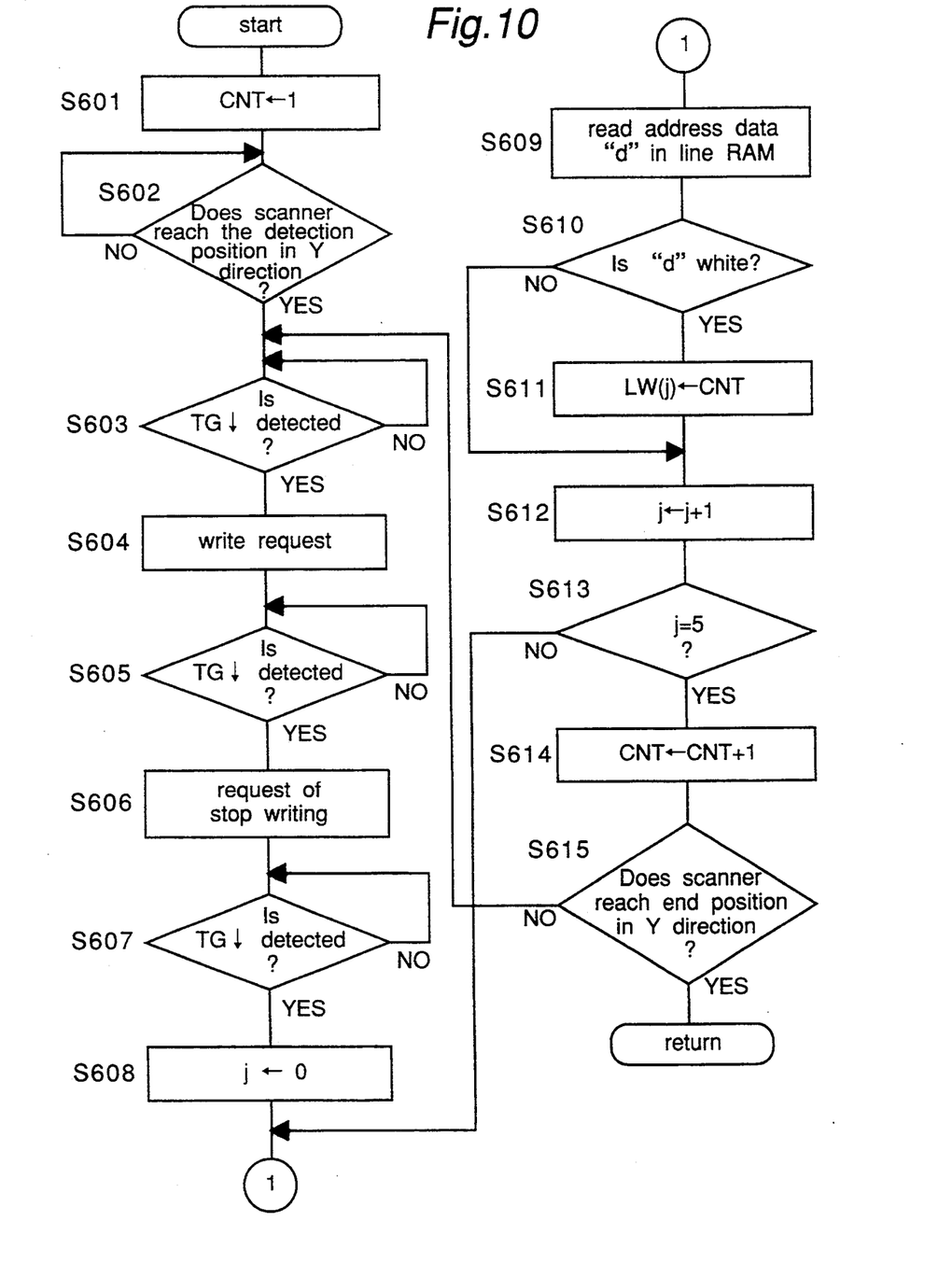
FIG. 10 is a flowchart of the size detection in the subscan direction.

FIG. 10 shows a flow of the edge detection in the subscan (Y) direction (step S407). First, a line parameter CNT is initialized to be one (step S601). Then, if it is decided that the scanner 10 reaches a predetermined detection line position CNT (CNT=1 in this case) (YES at step S602) and if a TG signal generated by the clock generator 302 is decided to be detected (YES at step S603), a write request is sent to the image sensor 14 (step S604). Next, when another TG signal is decided to be detected (YES at step S605), a write stop request is sent to the image sensor 14 (step S606), and the image data signals of a predetermined range in a line are stored in the line RAM 301. Next, when a still further TG signal is decided to be detected (YES at step S607), the image data stored in the line RAM 301 are read. Then, an address parameter "j" is initialized to be zero (step S608), and an image data "d" at an address ADR(j) is sampled in the data stored in the line RAM 301 (step S609). If "d" is decided to be white (YES at step S610) or if the value of "d" means the existence of the document 16, LW(j) which denotes the edge of the document 16 is updated as the value CNT (step S611). Then, "j" is incremented by one (step S612), and the flow returns to step S609 for the data of a different address position ADR(j). If the parameter "j" is decided to be five (YES at step S613), the data "d" at five addresses ADR(0)–(4) in the line of the line parameter CNT are examined. If at least one of the five data "d" is white, the line is decided to be on the document 16, and the LW(j) is updated to be the line parameter CNT. Then, the line parameter CNT is incremented by one (step S614), and the flow returns to step S603 for the next line position to repeat the above-mentioned processing. If it is decided that CNT is N or the last line position on the platen 15 in the subscan direction (YES at step S615), this flow returns to the main flow.

(e-4) Document Size Examination

Figure 11:
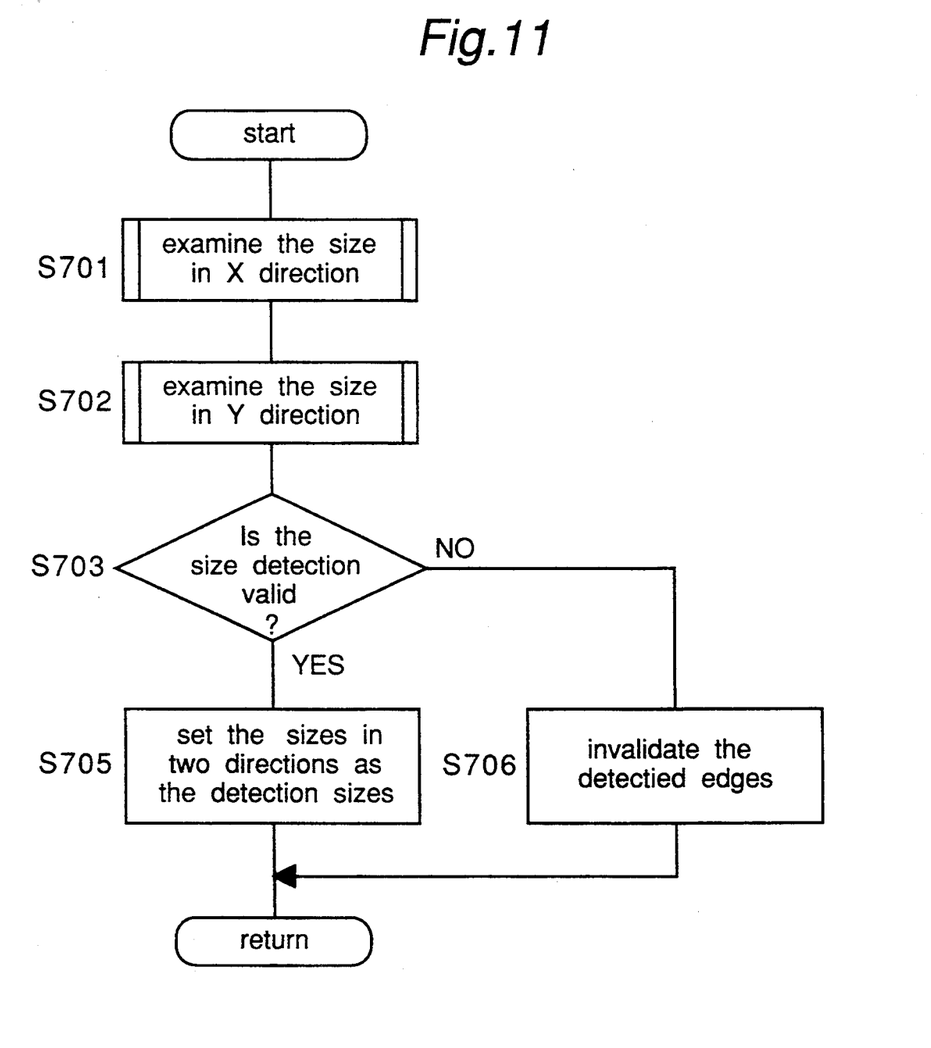
FIG. 11 is a flowchart of the examination of the document size.

FIG. 11 shows a flow of the examination of the document size (FIG. 8, step S408) on the basis of the detection values obtained in the edge detection processings at steps S405 and S407. First, the document size in the main scan direction is examined (step S701, FIG. 12), and the document size in the subscan direction is examined in the subscan direction (step S702, FIG. 13). Then, if edge detection in the main scan direction or in the subscan direction is decided to be valid or if the invalid flag is "1" (YES at step S703), the document sizes determined in the steps S701 and S702 are decided as the document sizes in the two direction (step S704), and the flow returns to the main flow. On the other hand, if either of the document sizes is decided not to be valid (NO at step S703), the detected edges are made invalid or they are not used to decided the document sizes (step S705), and the flow returns to the main flow to determine the document size again.

(e-5) Size Examination in the Main Scan Direction

Figure 12:
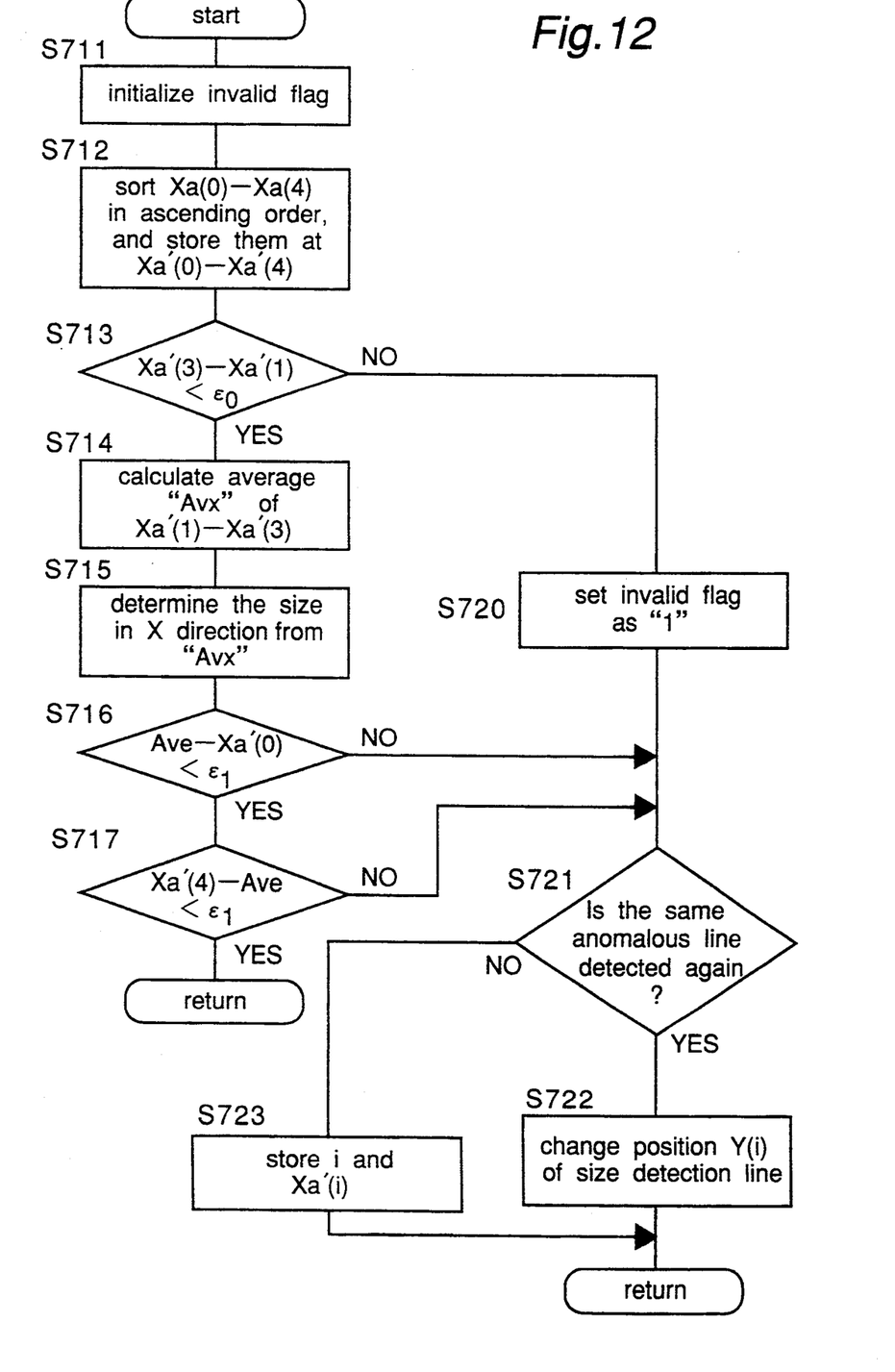
FIG. 12 is a flowchart of the size examination in the main scan direction.

FIG. 12 shows a flow of the size examination in the main scan direction (FIG. 11, step S701). First, an invalid flag F is initialized to be zero (step S711). Then, the values of the addresses Xa(1)–Xa(4) which denote the edges of the document in the main scan direction are sorted in ascending order and are stored in Xa'(1)–Xa'(4) (step S712).

First, it is decided if the difference between Xa'(3) and Xa'(1) is less than a predetermined range $\epsilon_0$ (YES at step S713) in order to check the scattering of the five data. If the scattering of the central three edges Xa'(1) Xa'(3) are decided to be small (YES at step S713), an average Avx of the three edges Xa'(1)–Xa'(3) of the central three values is calculated (step S714), and the size in the main scan direction is determined as the average Avx (step S715). Next, the average Avx is compared with Xa'(0) and Xa'(4) (step S716 and S717). Next, if the differences of the smallest edge Xa'(1) and of largest edge Xa'(4) from the average Avx are both less than a predetermined value $\epsilon_1$ (YES at steps S716 and S717), the document size is detected validly, and the flow returns to the flow in FIG. 11.

On the other hand, if the difference of Xa'(1) of Xa'(4) from the average is the predetermined value $\epsilon_1$ or larger (NO at step S716 or S717), the document size detection may be affected by disturbances such as dusts or damages on the line. Then, it is examined if the anomaly of the document size detection comes from the same origin of the anomaly detected previously (step S721). First, it is decided if the size detection value Xa(ix) of the same line parameter "ix" (1 or 4 in this case) detected previously becomes the smallest value Xa'(1) or the largest value Xa'(4) again and if the difference of Xa'(ix) from the average is larger than the predetermined value $\epsilon_1$ again. Further, it is also decided if the value of Xa(ix) is almost equal to that detected previously. If the decision is YES, this means that the same anomaly is detected again, and the detection line positions Y(ix) are changed to new lines different from the previous lines (step S722). On the other hand, if the decision is NO, the value "ix" and the size detection value Xa(ix) are stored (step S723). Then, the flow returns to the flow in FIG. 11.

At step S713, if it is decided that the scattering of the three edges Xa'(3)–Xa'(1) is larger than $\epsilon_0$ (NO st step S713), the scattering of the data is anomalously large, and this means that the edge detection is not performed normally. Then, the invalid flag F is set to be "1" (step S720). Then, the flow proceeds to step S721 to check that the same anomaly is observed again. In this case, the smallest value (ix=0) is used to the processing at step S721–723.

(e-6) Size Examination in the Subscan Direction

Figure 13:
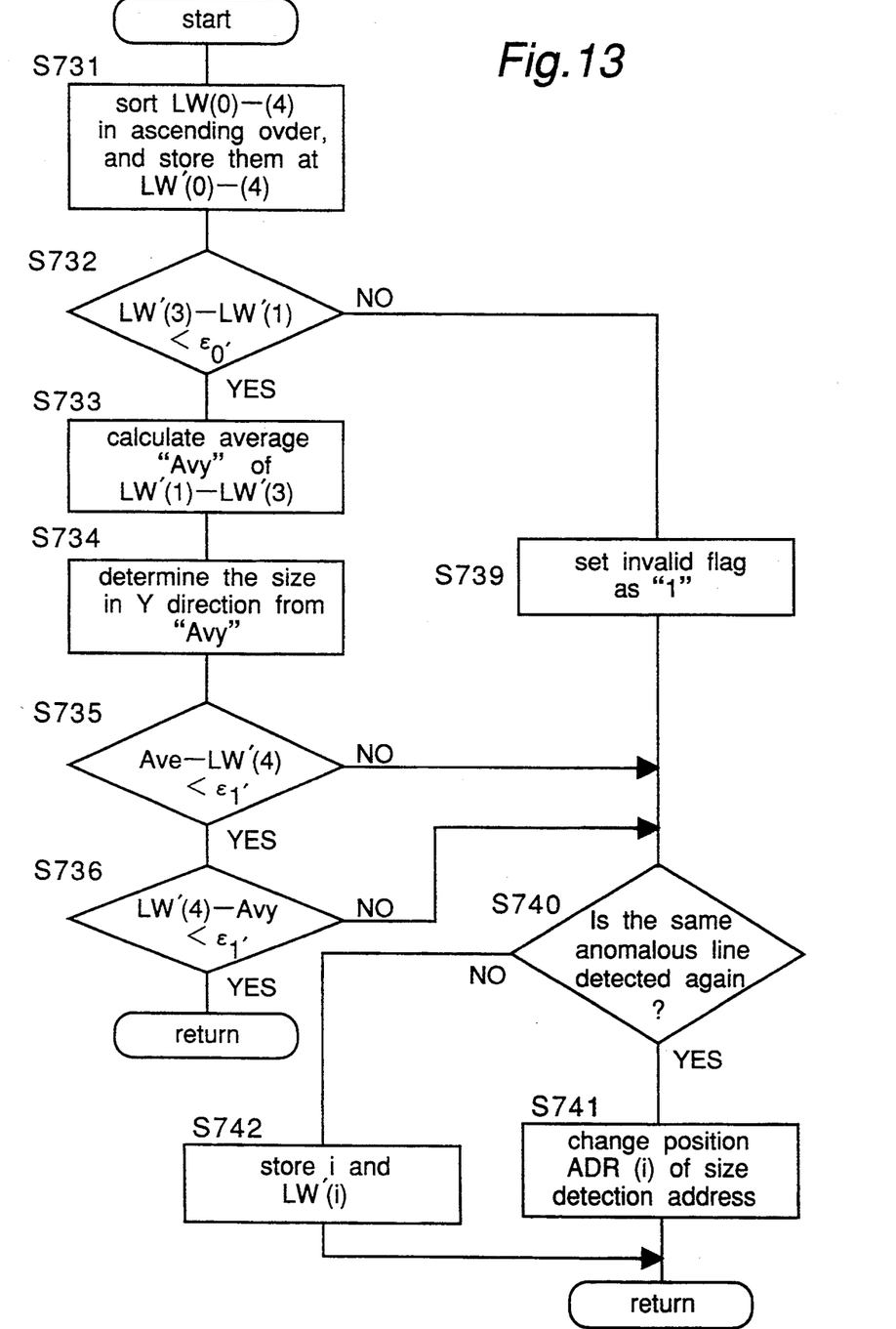
FIG. 13 is a flowchart of the size examination in the subscan direction.

FIG. 13 shows a flow of the size examination in the subscan (Y) direction (FIG. 11, step S702). First, the values of the addresses LW(1)–LW(4) which denote the edges of the document in the main scan direction are sorted in ascending order and are stored in LW'(1)–LW'(4) (step S731).

First, it is decided if the difference between LW'(3) and LW'(1) is less than a predetermined range $\epsilon_0$ (YES at step S732) in order to check the scattering of the five data. If the scattering of the central three edges LW'(1) LW'(3) are decided to be small (YES at step S732), an average Avy of the three edges LW'(1)–LW'(3) of the central three values is calculated (step S733), and the size in the main scan direction is determined as the average Avy (step S734). Next, the average Avy is compared with LW'(0) and LW'(4) (step S735 and S736). Next, if the differences of the smallest edge LW'(1) and of largest edge LW'(4) from the average Avy are both less than a predetermined value $\epsilon_1$ (YES at steps S735 and S736), the document size is detected validly, and the flow returns to the flow in FIG. 11.

On the other hand, if the difference of LW'(1) or of LW'(4) from the average is the predetermined value $\epsilon_1$ or larger (NO at step S735 or S736), the document size detection may be affected by disturbances such as dusts or damages on the line. Then, it is examined if the anomaly of the document size detection comes from the same origin of the anomaly detected previously (step S740). First, it is decided if the size detection value LW(iy) of the same line parameter "iy" (1 or 4 in this case) detected previously becomes the smallest value LW'(1) or the largest value LW'(4) again and if the difference of LW'(iy) from the average is larger than the predetermined value $\epsilon_1$ again. Further, it is also decided if the value of LW(iy) is almost equal to that detected previously. If the decision is YES, this means that the same anomaly is detected again, and the detection line positions Y(iy) are changed to new lines different from the previous lines (step S741). On the other hand, if the decision is NO, the value "iy" and the size detection value LW(iy) are stored (step S742). Then, the flow returns to the flow in FIG. 11.

At step S732, if it is decided that the scattering of the three edges LW'(3)–LW'(1) is larger than $\epsilon_0$ (NO at step S732), the scattering of the data is anomalously large, and this means that the edge detection is not performed normally. Then, the invalid flag F is set to be "1" (step S739). Then, the flow proceeds to step S741 to check that the same anomaly is observed again. In this case, the smallest value (iy=0) is used to the processing at step S740–742.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image reading apparatus comprising:
    an image reading means for reading image data of a plurality of lines in a document in at least one of a main scan direction and a subscan direction; and
    decision means for determining document edges for each of the plurality of lines determined from the image data read by said image reading means and for deciding a document size based on the document edges of the plurality of lines.

2. The image reading apparatus according to claim 1, wherein said decision means determines the document edge for each line from a position at which the white data exists last along the line.

3. The image reading apparatus according to claim 1, wherein the number of the plurality of lines is three or more and said decision means decides the document size as an average of the document edges of the lines.

4. The image read apparatus according to claim 3, wherein the number of the plurality of lines is three or more and said decision means decides the document size as an average of the document edges of the lines except the largest and smallest document edges.

5. The image reading apparatus according to claim 1 further comprising:
an anomalous line detection means for detecting an anomalous line for which an anomalous document edge value is decided by said decision means;
a memory means for storing the position and the document edge of the anomalous line detected by said anomalous line detection means; and
a line change means for changing the lines for detecting the document edge when said anomalous line detection means detects an anomalous line of substantially the same position and substantially the same document edge stored in said memory means.

6. The image reading apparatus according to claim 5, wherein said anomalous line detection means decides a line anomalous when the scattering of document sizes of the lines is large.

7. The image reading apparatus according to claim 5, wherein said anomalous line detection means decides that a line is anomalous when the line has image data having a document edge decided by said decision means differing largely from the image data of the other lines of the plurality of lines.

8. The image reading apparatus according to claim 5, wherein said anomalous line detection means decides a line as anomalous when the largest or smallest document edge deviates largely from the average of the document edges of the plurality of lines except the largest and smallest document edges.

9. The image read apparatus according to claim 1, further comprising an anomalous line detection means for detecting an anomalous line for which an anomalous document edge is decided by said decision means; wherein said decision means decides the document size on the basis of the image data of the plurality of lines except those of the anomalous line detected as anomalous by said anomalous line detection means.

10. An image reading apparatus comprising:
an image sensor means for reading image data of a plurality of lines in a document in at least one of a main scan direction and a subscan direction;
an anomalous line detection means for detecting an anomalous line having an anomalous document edge; and
a change means for changing the plurality of lines scanned by said image read means when said anomalous line detection means detects said anomalous line.

11. The image reading apparatus according to claim 10, wherein said change means changes the lines so as to exclude the anomalous line detected by said anomalous line detection means.

12. The image reading apparatus according to claim 10, said change means comprising:
a calculation means for calculating the difference of the document edge data of the line detected with those of the other lines in the plurality of lines;
a comparison means for comparing the value calculated by said calculation means with a predetermined value; and
a determination means for determining to change lines for document size detection when said comparison means decides that the value exceeds the predetermined value.

13. An image reading apparatus, comprising:
an image reading means for reading image data of a line in a document in a main scan direction and in a line in the document in a subscan direction with a linear image sensor;
a first decision means for detecting a document size in the main scan direction based on the image data of the line in the main scan direction read by said image reading means;
a second decision means for detecting a document size in the subscan direction based on the image data of the line in the subscan direction read by said image reading means; and
a scan means for moving said linear image sensor at a first speed when said linear image sensor detects the image data of the line in the main scan direction for document size detection in the main scan direction and for moving said linear image sensor at a second speed larger than the first speed when said image sensor detects the image data of the line in the subscan direction for document size detection in the subscan direction.

14. The image reading apparatus according to claim 13, wherein said image reading means reads image data in the main scan direction on a plurality of lines.

15. The image reading apparatus according to claim 13, wherein said image reading means reads image data in the subscan direction on a plurality of lines.

16. An image reading apparatus comprising:
an image reading means for reading image data of a plurality of lines in a document in at least one of a main scan direction and a subscan direction; and
decision means for determining dimensions for each of the plurality of lines based on the image data read by said image reading means and for deciding a document size based on the dimensions of the plurality of lines;
whereby said image reading means reads image data of the document in an area determined according to the document size decided by said decision means.

17. An image reading apparatus comprising:
an image reading means for reading image data of a line in a document in a main scan direction and in a line in the document in a subscan direction with a linear image sensor;
a first decision means for detecting an edge based on the image data of the line in the main scan direction read by said image reading means in the main scan direction;
a second decision means for detecting another edge based on the image data of the line in the subscan direction read by said image reading means in the subscan direction; and
a scan means for moving said linear image sensor at a first speed when said linear image sensor detects the image data of the line in the main scan direction for document size detection in the main scan direction and for moving said linear image sensor at a second speed larger than the first speed when said image sensor detects the image data of the line in the subscan direction for document size detection in the subscan direction;
whereby said image reading means reads image data of the document in an area determined according to the document size decided by said decision means.

18. A digital copying machine comprising:

an image reading means for reading image data of a plurality of lines in a document in at least one of a main scan direction and a subscan direction; and decision means for determining dimensions for each of the plurality of lines based on the image data read by said image reading means and for deciding a document size based on the dimensions of the plurality of lines;

whereby said image reading means reads image data of the document in an area determined according to the document size decided by said decision means.

19. A digital copying machine comprising:

an image reading means for reading image data of a line in a document in a main scan direction and in a line in the document in a subscan direction with a linear image sensor;

a first decision means for detecting an edge based on the image data of the line in the main scan direction read by said image reading means in the main scan direction;

a second decision means for detecting another edge based on the image data of the line in the subscan direction read by said image reading means in the subscan direction; and a scan means for moving said linear image sensor at a first speed when said linear image sensor detects the image data of the line in the main scan direction for document size detection in the main scan direction and for moving said linear image sensor at a second speed larger than the first speed when said image sensor detects the image data of the line in the subscan direction for document size detection in the subscan direction;

whereby said image reading means reads image data of the document in an area determined according to the document size decided by said decision means.

20. An image reading apparatus comprising:

an image reading means for reading image data of three or more lines in a document in at least one of a main scan direction and in a subscan direction; and decision means for deciding a document size based on document edges of each of the plurality of lines determining from the image reading means;

wherein said decision means decides the document size as an average of the document edges of the lines except largest and smallest document edges.

* * * * *